United States Patent [19]

Carroll

[11] Patent Number: 4,531,877

[45] Date of Patent: Jul. 30, 1985

[54] RAIL CAR DUMPING SYSTEM AND METHOD

[76] Inventor: Curtis E. Carroll, 9957 Tracy Rd., Atoka, Tenn. 38004

[21] Appl. No.: 462,476

[22] Filed: Jan. 31, 1983

[51] Int. Cl.³ .............................................. B65G 67/00
[52] U.S. Cl. .................................................. 414/372
[58] Field of Search .......................... 414/303, 354–356, 414/359–361, 364, 366, 371, 372, 420, 421, 575–577, 581; 188/59; 104/26 A; 198/403, 411, 412, 413

[56] References Cited

U.S. PATENT DOCUMENTS

| | | | |
|---|---|---|---|
| 560,727 | 5/1896 | Long | 414/359 X |
| 652,314 | 6/1900 | Hulett | 414/581 |
| 911,725 | 2/1909 | Hyslop | 414/421 X |
| 1,575,415 | 3/1926 | Crist | 414/366 |
| 1,735,022 | 11/1929 | Strauss | 414/356 X |
| 3,604,539 | 9/1971 | Goods | 188/59 |
| 3,760,961 | 9/1973 | Haditsch | 414/361 |
| 4,198,909 | 4/1980 | Plantureux | 104/26 A |

FOREIGN PATENT DOCUMENTS

| | | | |
|---|---|---|---|
| 1104432 | 4/1961 | Fed. Rep. of Germany | 414/359 |
| 370725 | 4/1932 | United Kingdom | 414/366 |
| 529656 | 11/1940 | United Kingdom | 414/360 |
| 1420621 | 1/1976 | United Kingdom | 414/359 |

Primary Examiner—Joseph E. Valenza
Assistant Examiner—David A. Bucci
Attorney, Agent, or Firm—B. P. Fishburne, Jr.

[57] ABSTRACT

Loaded rail cars in succession are positioned at an unloading station adjacent to plural connected car lifting and inverting jaw devices which revolve around a common horizontal pivot axis extending lengthwise of the car and across the jaw devices. First power operators connected between the relatively movable jaws of the devices produce the required relative movements of the jaws of the devices in unison to effect gripping of each loaded car in preparation for raising, inverting and emptying its contents into a receiver, and subsequently releasing each car following its return empty to an upright position at the unloading station. Second power operators connected between a stationary base and the jaw devices serve to rotate the jaw devices around the common horizontal pivot axis with each car toward and from the car emptying and upright positions. The rotating jaw devices may be counterweighted to reduce the power required to move them around their common pivot axis. A deflector connected across the jaw devices prevents premature emptying of the contents of each car as it approaches a gravity emptying position above the receiver.

4 Claims, 7 Drawing Figures

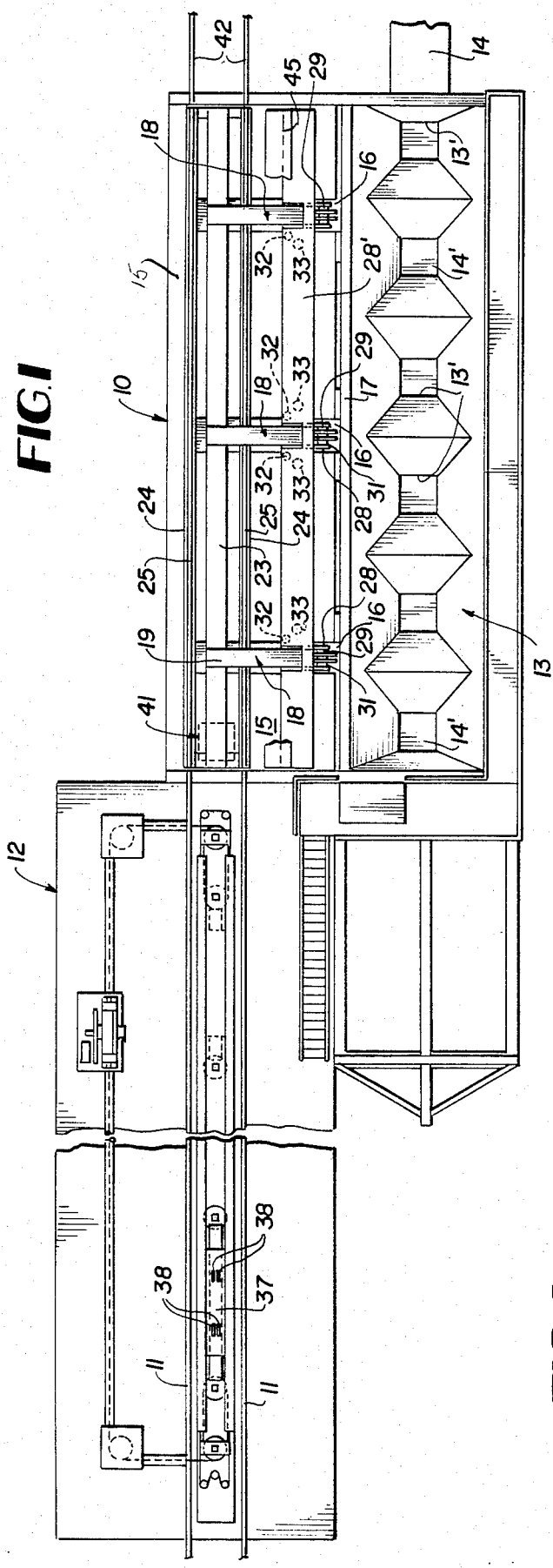
FIG.1
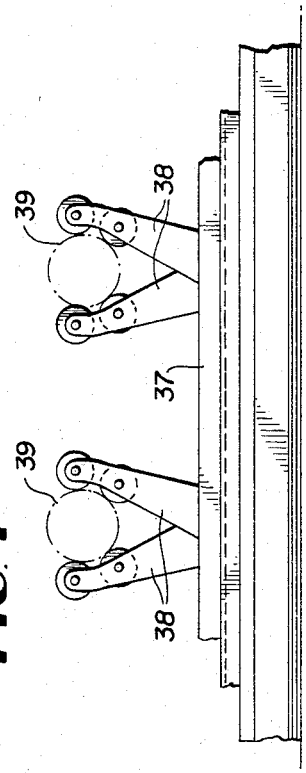
FIG.5
FIG.4

RAIL CAR DUMPING SYSTEM AND METHOD

BACKGROUND OF THE INVENTION

Apparatuses for emptying rail cars loaded with coal or similar flowables are known in the prior art in several configurations. A common drawback of the prior art devices has been exceedingly high cost of installation and operation due to the massive nature of the structures and the necessity for manufacturing gear or gear sectors having huge diameters. In one class of prior art car emptying apparatus, the car is moved inside of a large wheel-like device, where it is gripped and held while the device is bodily rotated by gearing or cable means toward and away from a car emptying position. This form of apparatus is very costly to manufacture and difficult and expensive to install.

A second form of prior art rail car emptying apparatus involves the entry of each car into a gripping device whose jaws are moved by one group of power cylinders, followed by lifting of each car as it is held by a second group of power cylinders to an intermediate position, in turn followed by rotation of the car and gripping device to an emptying position by a third group of power cylinders. This latter prior art system requires up to sixteen hydraulic cylinders in three different groups of varying sizes to effect the desired manipulation of the rail car. The system is complex, very costly and requires relatively complicated controls and substantial maintenance.

Accordingly, it is a prime object of this invention to substantially improve on the known prior art through the provision of a rail car emptying apparatus which is more simplified and practical, considerably less expensive to build and install, requires less maintenance and possesses a simpler mode of operation with the utilization of substantially fewer power cylinders compared to known devices.

Another object of the invention is to provide a car emptying apparatus which is an integral part of a complete system, including a car advancing and positioning means, and a receiver for the material emptied from the car including a regulated feeder to control delivery of the material onto a conveyer.

Another object of the invention is to provide a rail car emptying system adapted for control by a microprocessor, so as to achieve substantially complete automation of operation of the system.

Still another object is to provide a more simplified car emptying apparatus and a material receiver which are compatible in use with a commercial car positioning mechanism.

SUMMARY OF THE INVENTION

In its essence, the rail car emptying apparatus forming the main subject matter of the invention is comparable to a giant hand and arm which can grip each rail car in succession at an emptying station, lift the car while rotating it around a fixed axis of rotation until the car is substantially inverted over a a receiving hopper. The total contents of each car are thus emptied by gravity followed by operation of the apparatus in a reverse mode to return the car to its normal upright position.

The emptying apparatus is characterized by a series of connected C-shaped gripping jaws arranged at one side of each car at the emptying station. The gripping jaws include top and bottom arms above and below the car being gripped and inter-engaging relatively movable portions close to one side of the car. A first set of power cylinders connected between the inter-engaging portions produces relative movement of the upper and lower arms of the jaws to grip each car preparatory to its lifting. A second set of power cylinders connected between a fixed base and pivot members to which the upper jaws are fixed is operated to lift each car and rotate it toward and from the nearly inverted emptying position.

The apparatus can be counter-weighted to reduce the power required to move the car to and from the emptying position. A retarding deflector element is provided on the apparatus to prevent premature emptying of the car contents during its movement by the apparatus to the emptying position over the receiving hopper.

Other features and advantages of the invention will be apparent during the course of the following description.

BRIEF DESCRIPTION OF THE DRAWING

FIG. 1 is a partly schematic plan view of a rail car emptying system according to the present invention.

FIG. 4 is an enlarged fragmentary side elevation showing parts of a car advancing and positioning apparatus.

FIG. 5 is a view of such apparatus taken at right angles to FIG. 4.

DETAILED DESCRIPTION

Figure 2:
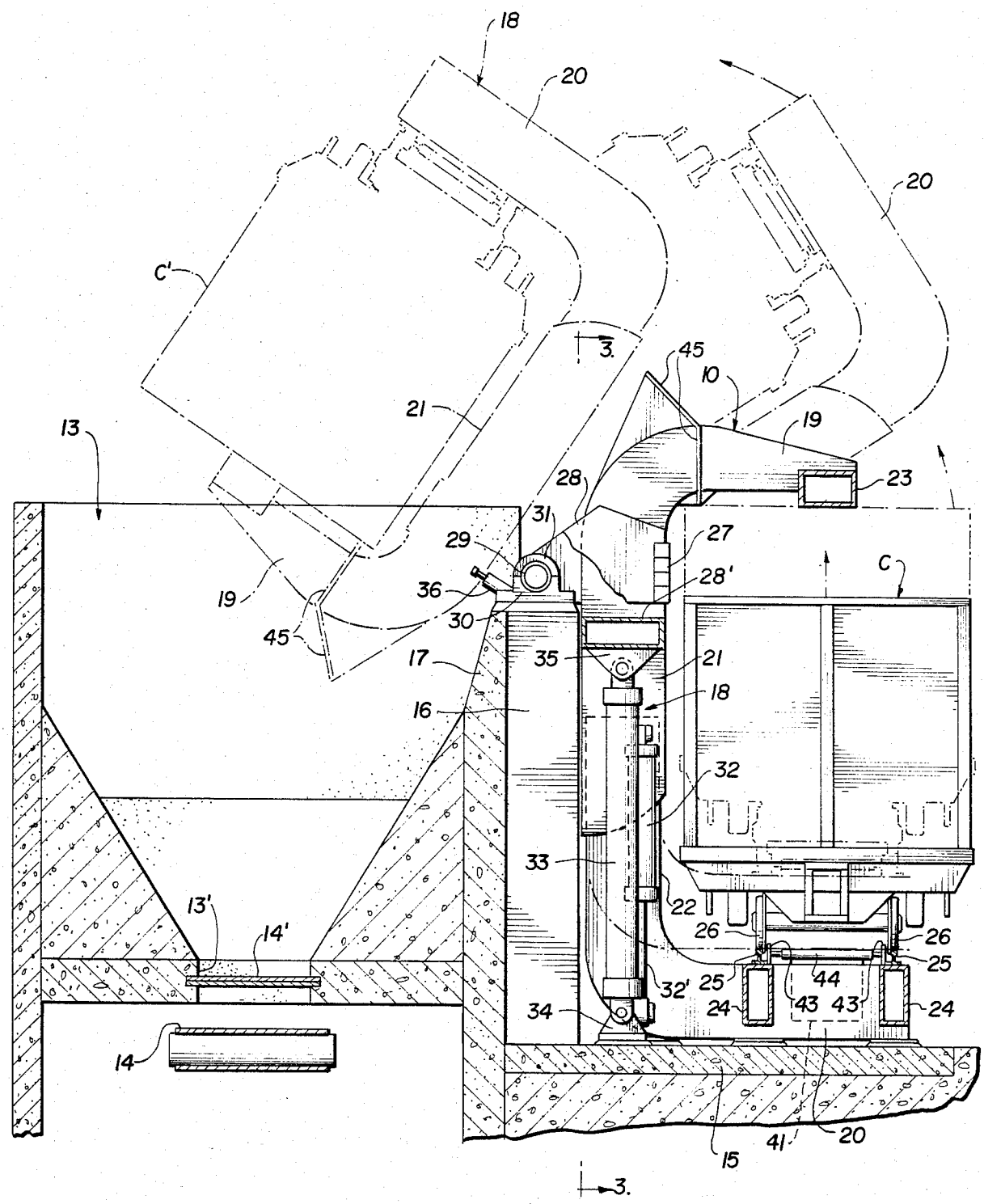
FIG. 2 is an end elevation of the system partly in cross section showing in phantom lines intermediate and final emptying positions of a car.

Referring to the drawings in detail, wherein like numerals designate like parts, FIG. 1 shows a rail car emptying system in its entirety. This system consists essentially of a car emptying or dumping apparatus 10, a dumped material hopper or receiver 13, and a car advancing and positioning apparatus 12. The apparatus 12 can be a known commercial apparatus manufactured and sold by Stephens-Adamson Company, Aurora, Ill., or an equivalent mechanism.

The three primary system components 10, 13 and 12 are structurally integrated in any acceptable manner, as by steel or reinforced concrete fabrication.

In the operation of the system rail cars C approach the emptying system on tracks 11 which terminate at the downstream end of the advancing and positioning apparatus 12. By means of this apparatus 12, the cars, one at a time, in succession, are advanced onto aligned track sections 25 of the apparatus 10 where they are firmly gripped, elevated and rotated to a nearly inverted contents-dumping position indicated at C', following which, each car is returned by the apparatus 10 to its normal upright position preparatory to moving out of the dumping station on downstream tracks 42 so that the next full car can move into the dumping or emptying station.

Coal or other solid-flowable material emptied into the receiver 13 is delivered in a controlled manner onto a conveyor 14 below the receiver by means of which it is moved to a storage or utilization point.

Figure 3:
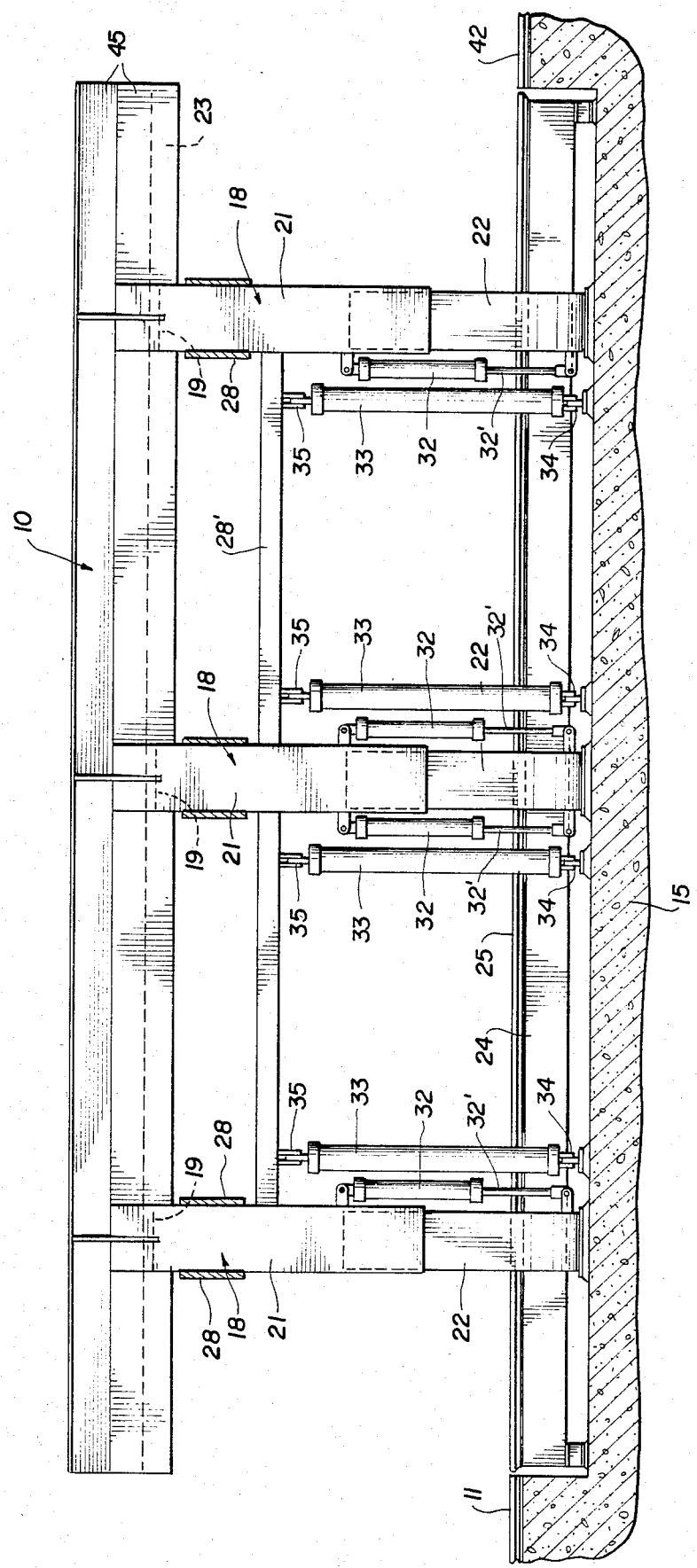
FIG. 3 is a longitudinal vertical section taken on line 3—3 of FIG. 2.

The heart of the invention resides in the individual car emptying apparatus 10, best shown in its details in FIGS. 2 and 3 of the drawings. This apparatus comprises a horizontal stationary base 15 extending for the length and width of the apparatus 10. Pillars 16 rise vertically from the base 15 and are structurally tied to the latter. These pillars are spaced apart equidistantly along the apparatus 10 and constitute projecting parts of an adjacent longitudinal vertical wall 17. The apparatus 10 may be based on pilings not shown or other stable foundation means.

The apparatus 10 further includes preferrably three identical C-shaped clamp or jaw units 18 which operate in unison to grip each car C firmly and move it to and from the emptying position above the receiver 13. Each such unit 18 includes upper and lower horizontal jaw arms 19 and 20 and vertical telescopically inter-fitting portions 21 and 22 disposed close to one side of the car C when the latter is positioned in the apparatus 10. The upper arms 19 are connected by a horizontal longitudinal clamping beam 23 which extends for the length of the apparatus 10 and is positioned at the transverse center of the car C. The lower jaw arms 20 are similarly inter-connected by a pair of laterally-spaced parallel horizontal longitudinal beams 24 which also extend for the length of the apparatus 10. The lower beams 24 are centered with respect to the car C and the upper beam 23 so that the car will be gripped in a most stable manner along its entire length and at its transverse center by the jaw units 18 as will be further discussed.

Within the apparatus 10 the track sections 25 are fixed securely to the tops of the beams 24 and are co-extensive lengthwise therewith. These track sections guide and support the wheels 26 of each rail car while it is in the apparatus 10, the wheels never separating from the track sections 25 during the car emptying process. Preferrably a timber buffer 27 is fixed to the interior side of each vertical portion 21 of each jaw unit near and below the upper arm 19. The adjacent side wall of the car C can contact these timber buffers for added stability during the manipulation of the car by the apparatus.

A sturdy pivot bracket 28 is welded to the upper telescopic portion 21 of each jaw unit 18. These brackets are supported on coaxial horizontal longitudinal pivot shafts 29 held in pillow blocks 30 atop the pillars 16 and having caps 31. The coaxial shafts 29 define a common horizontal axis around which the jaw units 18 rotate in unison between the normal upright and emptying positions for the rail car shown in FIG. 2. In some cases, a continuous pivot shaft for the jaw units 18 is employed instead of the several short shafts 29 shown in FIGS. 1 and 2.

In order to grip the car C firmly in preparation for its lifting and inverting, four vertical axis hydraulic cylinders 32 are connected between the telescoping portions 21 and 22 of the jaw units 18 close to their sides. To distribute loading efficiently, a pair of the cylinders 32, FIG. 3, is provided on opposite sides of the center jaw unit 18, while only one cylinder 33 is arranged at the interior side of each outboard unit 18. While three jaw units 18 and four cylinders 32 are preferrable in the apparatus 10, nevertheless the invention is not limited to these numbers and, in some cases, a different number of jaw units and jaw operating cylinders could be used.

It may be noted that the upper jaw arms 19 which are rigid with pivot brackets 28 are immovable except for rotational movement around the pivot axis defined by the shafts 29. Therefore, when the rods 32' of cylinders 32 are retracted, the lower jaw arms 20 are elevated to lift the car C vertically into clamping engagement with the lower side of clamping beam 23 prior to the beginning of the rotational movement of the jaw units 18 and car to the emptying position.

For the purpose of producing the required rotational movement of each car through approximately 160 degrees of movement from the normal upright position shown in full lines in FIG. 2 to the emptying position above the receiver 13 shown in phantom lines, four additional hydraulic cylinders 33 are employed. These cylinders have their axes parallel to the axes of the cylinders 32 and are connected between anchors 34 and 35 on the base 15 and pivot brackets 28, respectively, the brackets 28 including a connecting beam 28'. These cylinders 33, as well as the jaw closing and opening cylinders 32, are properly timed in their operations by state-of-the-art hydraulic controls, not shown. The two groups of cylinders 32 and 33 begin and end their operations at different times and the four cylinders within each group operate in unison.

Upon reaching the emptying position C', FIG. 2, caused by extension of cylinders 33, the elbow region of each upper jaw arm 19 will engage a hydraulic shock absorber cylinder 36, FIG. 2, mounted at a proper angle on top of wall 17. This will cushion the jaw units 18 as they reach the car emptying position and will add safety to the system. Also, at the start of return travel of the jaw units 18 toward the normal car upright position, the shock absorber cylinders 36 are extended by the conventional control means to add additional starting power to the apparatus, thus taking some strain off cylinders 33 as they begin to retract.

A further feature of the invention is the provision on the apparatus 10 of a deflector plate 45 secured to the upper jaw arms 19 near their elbow portions and rising therefrom at an angle of about 45 degrees to the vertical. The deflector 45 is continuous along the length of the apparatus 10 and extends across the three gripping jaw units 18. When each car C is gripped by the jaw units 18, the deflector 45 forms a lip projecting forwardly of the open top of the car along one side thereof. As the car is progressively lifted and rotated around the axis defined by shafts 29, the deflector 45 will tend to hold back or retard emptying of the car contents until the car is in or very close to the proper emptying position C' shown in FIG. 2.

The overall mode of operation of the system is as follows. A movable carriage means 37 of the conventional car positioning apparatus 12 includes pairs of pivoted dogs 38 which rise automatically at proper times to engage and straddle the axles 39 of a car truck, FIGS. 4 and 5. Following such engagement, the carriage 37 advances the coupled cars on the lead-in track 11 sufficiently to place one car on the track sections 25 of the apparatus 10. On the base of the apparatus 10 between the two track supporting beams 24, FIG. 1, is a known type of car locking and ejecting device 41. Such a device is manufactured by Stephens-Adamson Company, Aurora, Ill. The details of the device 41 are not necessary to enable a full understanding of the invention. It should be sufficient to state that after each car C is advanced by the apparatus 12 into the apparatus 10 and the dogs 38 are retracted from the axles 39, similar means on the device 41 will engage and hold the car axles in fixed positions until the gripping jaws 18 are activated to grip each car firmly. Subsequently, after each car is inverted and emptied of its contents and returned to its normal upright position, the conventional unit 41 is operated to eject the empty car from the apparatus 10 by propelling it off of track sections 25 and onto takeaway tracks 42 which are inclined for moving ejected cars by gravity to a collection point.

Additionally, while each car is on the track sections 25 of emptying apparatus 10 the car wheels 26 are positively held against turning by wheel brakes 43, FIG. 2, which are activated by a double-acting cylinder 44 adjacent to each pair of car wheels. The brakes 43 are in essence plates which are spread apart so as to grip the flanges of wheels 26 to prevent their rotation. This safety braking arrangement is additional to the restraining action of device 41 and thus forms a safety backup means to prevent movement of a car on track sections 25.

After entry of each car onto the appratus 10 in the above described manner, the cylinders 32 are energized to retract rods 32' to lift jaw arms 20 with the car C until the top of the car is gripped by the beam 23. Following this, and while the car continues to be gripped, the cylinders 33 are energized to extend their rods and rotate the brackets 28 with the clamping jaw units 18 around the pivot axis defined by shafts 29 until the car is substantially inverted over the receiver 13 and emptied. Reverse operation of the cylinders 33 will return the car to the upright position after which the cylinders 32 are again operated to lower the jaw arms 20 with the car to release it from clamped engagement. The safety braking means 43 is now released and the car is ejected from the apparatus 10 as described.

The coal or other product dumped into the receiver 13 is delivered from the bottom of the receiver or hopper through outlets 13' onto the horizontal conveyor 14. So that this conveyor will not be overloaded, a conventional feed regulator means 14' of a reciprocating or vibrating type is placed in the outlet 13' to control the rate of flow of material onto the takeaway conveyor 14.

Figure 6:
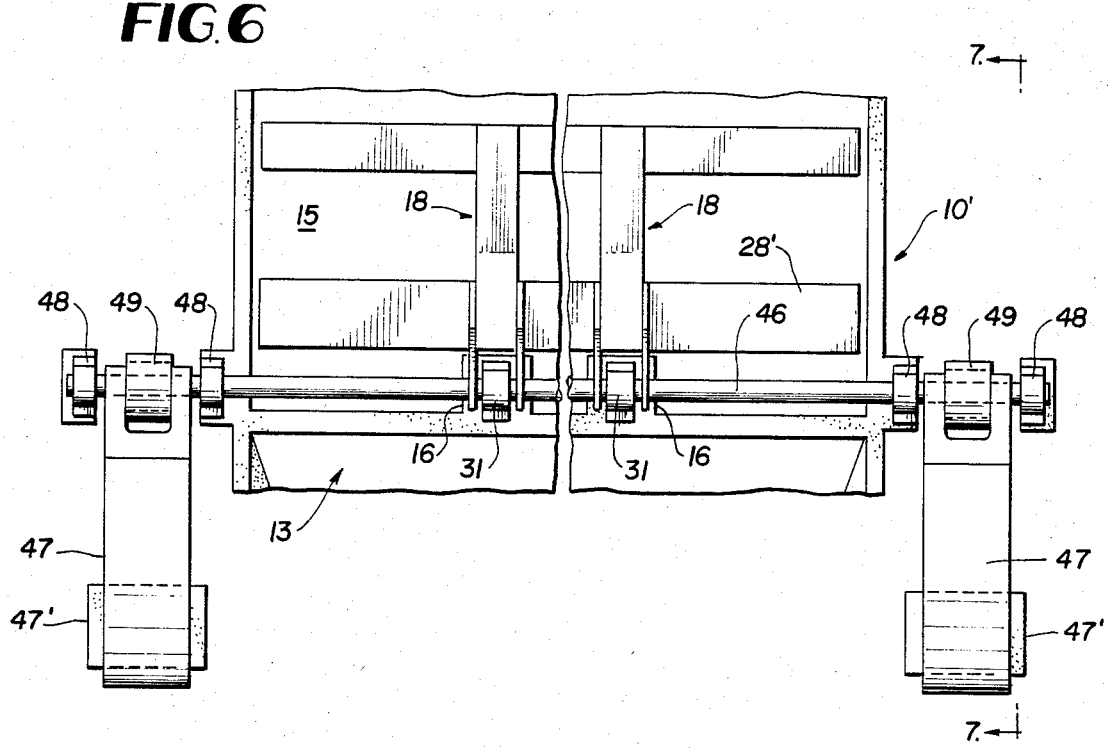
FIG. 6 is a plan view of a counter-weighted car emptying apparatus in accordance with a modification of the invention.
Figure 7:
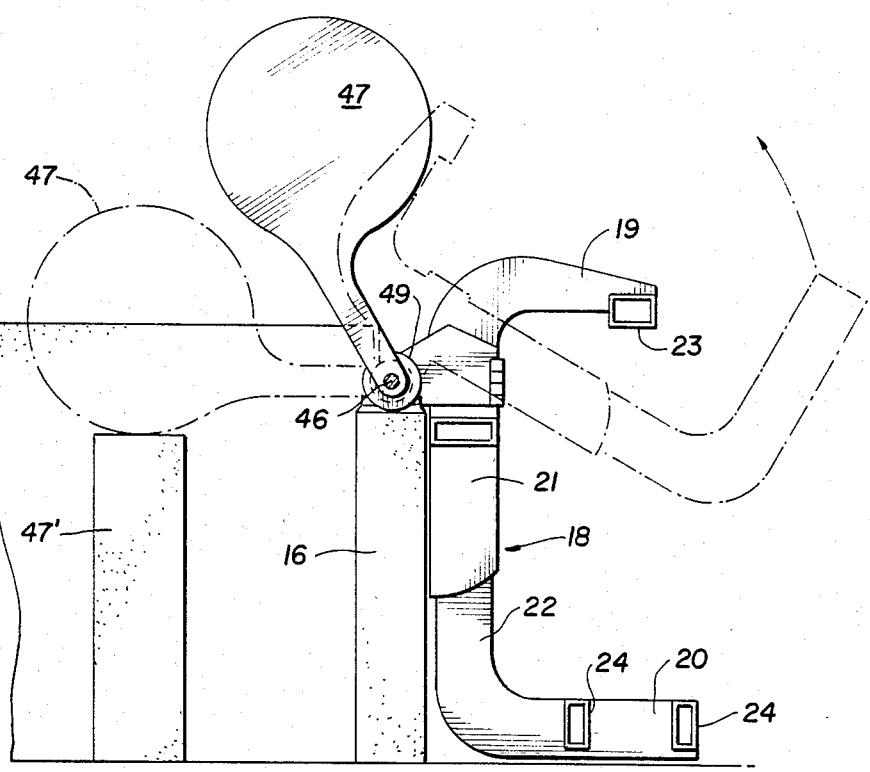
FIG. 7 is an end elevation of the apparatus shown in FIG. 6.

FIGS. 6 and 7 of the drawings show a modified form of emptying apparatus 10' in which the pivot axis of gripping jaw units 18 is defined by a continuous horizontal longitudinal shaft 46 rather than the plural coaxial shafts 29 of the prior embodiment. Each end of the shaft 46 mounts a massive counterweight 47, such as a 50 ton counterweight to counteract the mass of the loaded car C and gripping jaw mechanism. The shaft 46 has sturdy bearings 48 on opposite sides of each counterweight.

Each counterweight 47 is coupled rotationally to the shaft 46 by a lost motion single engaging latching collar 49 which enables substantial rotational movement of the shaft 46 without moving the counterweights 47. For example, when the cylinders 33 are beginning to lift and rotate each car C, the counterweights 47 are positioned 60 degrees to the horizontal approximately, locked to the shaft 46 by the lost motion collar 49, and turn therewith. As the loaded car C approaches the top of its arc of movement prior to emptying, such as the intermediate position shown in FIG. 2, the counterweights 47 will move downwardly counterclockwise, toward a horizontal position in FIG. 7. At such position, the counterweights may be arrested in their rotation by any solid abutment 47' and the shaft 46 can continue to rotate under influence of cylinders 33 until the car is in the emptying position above the receiver 13 without further movement of the counterweights. It can be seen that the counterweights 47 are effectively employed to relieve the cylinders 33 of the greatest loading when the car is in the initial upright position fully loaded and up to the point when the car is approaching but has not yet reached the emptying position. Beyond this point, the effective load on the cylinders 33 is lessened, as where the car nears a dead center relationship with the axis of pivot shaft 46. Beyond this point, as explained, the counterweights 47 become inactive.

During return travel of jaw units 18 toward the car upright position, the counterweights 47 remain inactive due to the lost motion ability of the collar 49 until the car is again near the intermediate position shown in FIG. 2, at which time the counterweights 47 are reengaged with shaft 46 and carried along in the clockwise direction, FIG. 7, until the car reaches a full down upright position.

The use of the counterweights 47 reduces the power required to raise and lower the car and associated mechanism and therefore enables the use of smaller and less powerful cylinders 33.

The relative simplicity of the invention, its compactness, and its improved mode of operation compared to the prior art should now be apparent to those skilled in the art.

It is to be understood that the form of the invention, herewith shown and described, is to be taken as a preferred example of the same, and that various changes in the shape, size and arrangement of parts may be resorted to without departing from the spirit of the invention or scope of the subjoined claims.

I claim:

1. A rail car emptying apparatus comprising a substantially C-shaped rail car gripping jaw means including upper horizontal jaws and lower horizontal jaws which are movable vertically toward and away from the upper horizontal jaws, the upper and lower horizontal jaws havng vertical telescopically engaging portions adapted for positioning near one side of a rail car being emptied by the apparatus, a fixed horizontal axis pivot disposed at an elevation near and below the upper horizontal jaws and near the top of a rail car being emptied when the latter is upright, a bracket on said pivot and turning therewith and being fixed to the upper horizontal jaws, first comparatively short stroke power cylinder means connected between the telescopically engaging vertical portions of said upper and lower horizontal jaws and being operable to lift the lower jaws and a rail car thereon vertically through a distance whereby the top of such car will engage the upper horizontal jaws firmly, and second comparatively long stroke power cylinder means connected between the pivot bracket and a fixed anchor of the aparatus and being operable independently of and after the vertical car lifting operation of the first power cylinder means to rotate the entire C-shaped rail car gripping jaw means around the axis of said pivot to a rail car emptying position where a car held in the gripping jaw means is substantially inverted at an elevation near and above said pivot.

2. A rail car emptying apparatus as defined in claim 1, and a deflector plate connected across the upper horizontal jaws and projecting in an inclined plane from corresponding sides of the upper jaws and being operable to resist premature emptying of a rail car during movement of the same from a level upright position to a nearly inverted and elevated emptying position.

3. A rail car emptying apparatus as defined in claim 2, and counterweight means attached to said pivot through a lost motion connection whereby the counterweight means will turn with the pivot through a part only of its rotational movement toward and away from a rail car emptying position.

4. A rail car emptying apparatus comprising telescopically engaging upper and lower rail car gripping jaws, said lower jaws being adapted for engagement under the wheels of a rail car when the car is in a level upright loaded position, the upper jaws then being spaced above the top of said car, a first power cylinder means connected between the telescopically engaging upper and lower jaws and being operable to raise the lower jaws with a rail car thereon vertically a sufficient distance to bring the top of the car into engagement with a bottom surface member of the upper jaw, a horizontal axis elevated pivot means for said upper and lower gripping jaws and including a bracket member attached to the upper jaws only, and a second power cylinder means connected between said bracket member and a fixed anchor element of the apparatus and being operable independently of and subsequent to the operation of the first power cylinder means to transport the upper and lower rail car gripping jaws around the axis of said pivot means toward and from a rail car emptying position while the upper and lower jaws remain grippingly engaged to the rail car, said first power cylinder means then being operable to move the lower jaws downwardly vertically away from the upper jaws to release a rail car when it is returned empty to a level upright position.

* * * * *